(12) United States Patent
Lundberg et al.

(10) Patent No.: US 9,599,214 B2
(45) Date of Patent: Mar. 21, 2017

(54) HYDRAULIC CONTROL SYSTEM WITH ETRS AND MULTIPLEXED CLUTCH CONTROL FOR A TRANSMISSION

(71) Applicant: GM Global Technology Operations LLC, Detroit, MI (US)

(72) Inventors: Philip C. Lundberg, Keego Harbor, MI (US); Christopher G. Benson, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 162 days.

(21) Appl. No.: 14/517,074

(22) Filed: Oct. 17, 2014

(65) Prior Publication Data

US 2015/0129385 A1   May 14, 2015

Related U.S. Application Data

(60) Provisional application No. 61/901,520, filed on Nov. 8, 2013.

(51) Int. Cl.
   F16H 61/02   (2006.01)
   F16H 61/66   (2006.01)
   F16H 63/34   (2006.01)
   F16H 63/48   (2006.01)

(52) U.S. Cl.
   CPC ..... F16H 61/0206 (2013.01); F16H 63/3483 (2013.01); F16H 63/483 (2013.01); F16H 2061/6608 (2013.01)

(58) Field of Classification Search
   CPC ......... F16H 61/0206; F16H 2061/6608; F16H 63/3483; F16H 63/483
   See application file for complete search history.

(56) References Cited

U.S. PATENT DOCUMENTS

| | | | |
|---|---|---|---|
| 7,270,027 B2 | 9/2007 | Berger et al. | |
| 2013/0319156 A1 | 12/2013 | Berger et al. | |
| 2013/0327172 A1* | 12/2013 | Berger | F16H 59/045 74/473.11 |
| 2014/0360302 A1* | 12/2014 | Lundberg | F16H 61/0021 74/473.11 |

FOREIGN PATENT DOCUMENTS

CN   102121528 A   7/2011

OTHER PUBLICATIONS

Pending U.S. Appl. No. 14/293,218, filed Jun. 2, 2014, by Philip C. Lundberg. All Pages.

* cited by examiner

Primary Examiner — Richard Lorence

(57) ABSTRACT

An electronic transmission range selection hydraulic control system includes a source of pressurized hydraulic fluid, a first mode valve assembly in fluid communication downstream of the source of pressurized hydraulic fluid, a drive clutch actuator connected to a drive clutch and in fluid communication directly downstream of the first mode valve assembly, a reverse clutch actuator connected to a reverse clutch and in fluid communication directly downstream of the first mode valve assembly, a second mode valve assembly in fluid communication directly downstream of the first mode valve assembly, and a park servo connected to the park mechanism and in fluid communication directly downstream of the first mode valve assembly and the second mode valve assembly.

20 Claims, 3 Drawing Sheets

HYDRAULIC CONTROL SYSTEM WITH ETRS AND MULTIPLEXED CLUTCH CONTROL FOR A TRANSMISSION

CROSS-REFERENCE TO RELATED APPLICATIONS

This application claims the benefit of U.S. Provisional Application No. 61/901,520 filed Nov. 8, 2013. The disclosure of the above application is incorporated herein by reference.

TECHNICAL FIELD

The invention relates to a control system for a continuously variable transmission, and more particularly to an electro-hydraulic control system having electronic transmission range selection (ETRS) with multiplexed clutch control for a transmission.

BACKGROUND

A typical stepped transmission or a continuously variable transmission (CVT) includes a hydraulic control system that is employed to provide cooling and lubrication to components within the transmission and to actuate torque transmitting devices such as drive clutches or torque converter clutches, belt pulley positions in CVT's, and Park positions. The conventional hydraulic control system typically includes a main pump that provides a pressurized fluid, such as oil, to a plurality of valves and solenoids within a valve body. The main pump is driven by the engine of the motor vehicle. The valves and solenoids are operable to direct the pressurized hydraulic fluid through a hydraulic fluid circuit to various subsystems including lubrication subsystems, cooler subsystems, torque converter clutch control subsystems, and shift actuator subsystems that include actuators that engage the torque transmitting devices, the pulleys that move the belt of the CVT, and an actuator that engages & disengages Park. The pressurized hydraulic fluid delivered to the pulleys is used to position the belt relative to input and output variators in order to obtain different gear ratios.

While previous hydraulic control systems are useful for their intended purpose, the need for new and improved hydraulic control system configurations within transmissions which exhibit improved performance, especially from the standpoints of efficiency, responsiveness and smoothness, is essentially constant. Accordingly, there is a need for an improved, cost-effective hydraulic control system for use in a hydraulically actuated transmission.

SUMMARY

A hydraulic control system for a stepped transmission or CVT is provided. The hydraulic control system includes an ETRS subsystem that is multiplexed to provide clutch control to a forward and a reverse clutch in the transmission.

For example, an ETRS hydraulic control system for a continuously variable transmission having a drive clutch, a reverse clutch, and a park mechanism is provided. The hydraulic control system includes a source of pressurized hydraulic fluid, a first mode valve assembly in fluid communication downstream of the source of pressurized hydraulic fluid, a drive clutch actuator connected to the drive clutch and in fluid communication directly downstream of the first mode valve assembly, a reverse clutch actuator connected to the reverse clutch and in fluid communication directly downstream of the first mode valve assembly, a second mode valve assembly in fluid communication directly downstream of the first mode valve assembly, and a park servo connected to the park mechanism and in fluid communication directly downstream of the first mode valve assembly and the second mode valve assembly.

In one aspect, the first mode valve assembly includes a first mode valve moveable between a drive position and a reverse position, wherein the first mode valve allows fluid communication from the source to the drive clutch actuator when in the drive position and allows fluid communication from the source to the reverse clutch actuator when in the reverse position.

In another aspect, the second mode valve assembly includes a second mode valve moveable between an out-of-park position and a park position, wherein the second mode valve allows fluid communication to an out-of-park side of the park servo when in the out-of-park position and prohibits fluid communication to the out-of-park side of the park servo when in the park position.

In another aspect, a first solenoid is in fluid communication with the first mode valve, wherein the first solenoid selectively moves the first mode valve to the drive position.

In another aspect, a second solenoid is in fluid communication with the second mode valve, wherein the second solenoid moves the second mode valve to the out-of-park position.

In another aspect, a latch valve assembly is in fluid communication downstream of the source of pressurized hydraulic fluid and is in fluid communication directly upstream of the first mode valve assembly.

In another aspect, a first valve position sensor is configured to sense the position of the first mode valve and a second valve position sensor is configured to sense the position of the second mode valve.

In another aspect, a drive/reverse solenoid is in fluid communication downstream of the second mode valve assembly and is in fluid communication directly upstream of the first mode valve assembly.

In another aspect, a first three-way ball check valve is in fluid communication directly downstream of the second mode valve assembly and is in fluid communication directly upstream of the drive/reverse solenoid.

In another aspect, a second three-way ball check valve is in fluid communication directly downstream of the first and the second mode valve assembly and is in fluid communication directly upstream of an out-of-park side of the park servo.

In another aspect, the hydraulic controls system includes a third three-way ball check valve disposed between the first three-way ball check valve and the second mode valve assembly and the second three-way ball check valve.

In another aspect, the first and second mode valve assemblies include latching valves.

Further aspects and advantages of the present invention will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

DESCRIPTION

Figure 1:
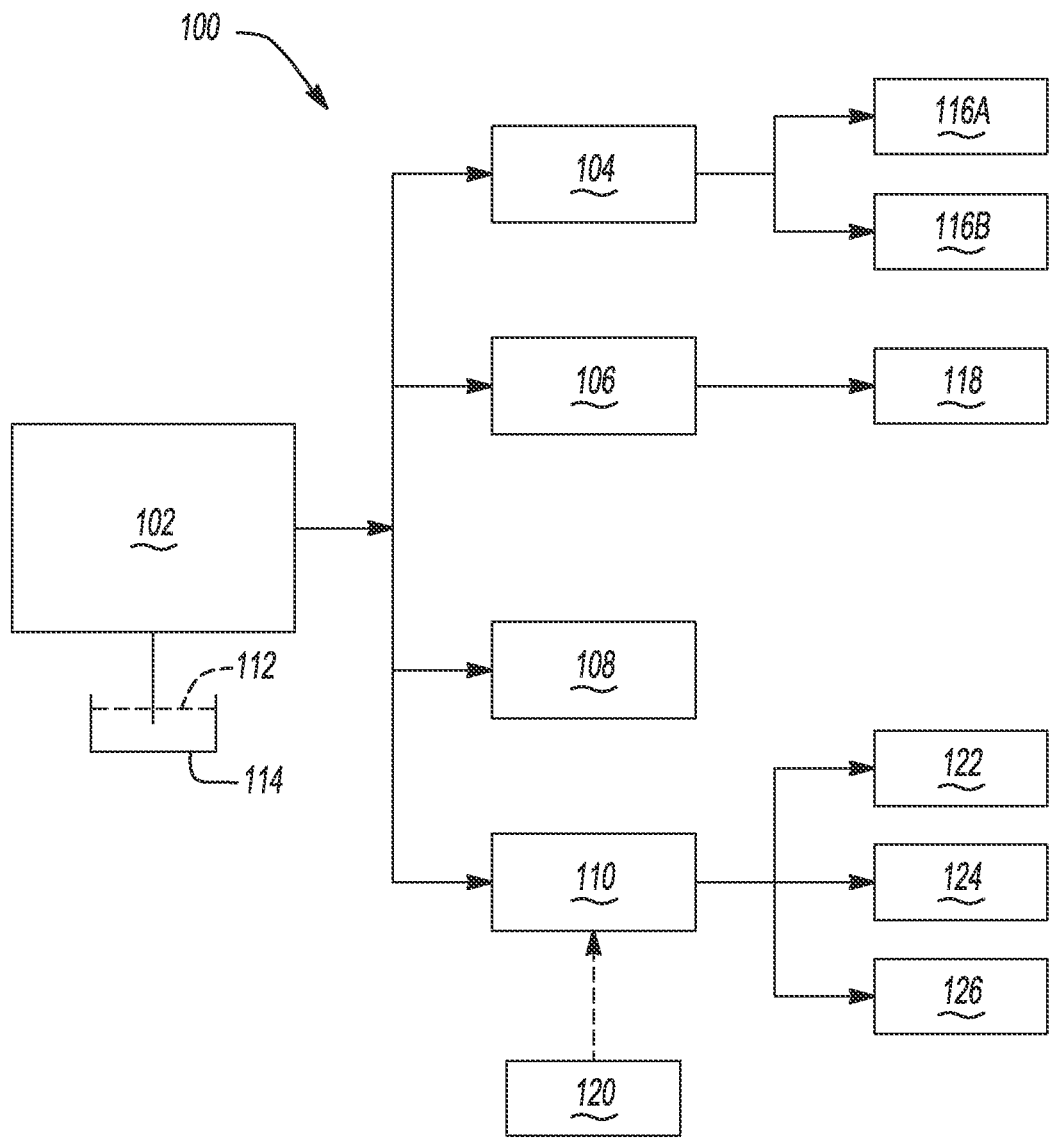
FIG. 1 is a block diagram of a hydraulic control system according to the principles of the present invention.

With reference to FIG. 1, a block diagram of a hydraulic control system according to the principles of the present invention for use with a continuously variable transmission (CVT) is generally indicated by reference number 100. It should be appreciated that while the hydraulic control system is directed to a CVT by way of example, the principles of the present invention may be applied to a stepped automatic transmission. The hydraulic control system 100 generally includes a plurality of interconnected or hydraulically communicating circuits or subsystems. For example, the hydraulic control system 100 may include a pressure regulator subsystem 102, a ratio control subsystem 104, a torque converter control (TCC) subsystem 106, an engine stop/start (ESS) subsystem 108, and an electronic transmission range selection (ETRS) subsystem 110 multiplexed with clutch control. It should be appreciated that the hydraulic control system 100 may have additional subsystems or may not include the TCC or ESS subsystems without departing from the scope of the present invention. The pressure regulator subsystem 102 is an example of a source of pressurized hydraulic control fluid 112, such as transmission oil, that is provided throughout the hydraulic control system 100. The pressure regulator subsystem 102 draws hydraulic fluid 112 from a sump 114. The sump 114 is a tank or reservoir preferably disposed at the bottom of a transmission housing to which the hydraulic fluid 112 returns and collects from various components and regions of the transmission. The hydraulic fluid 112 is forced from the sump 114 and communicated throughout the hydraulic control system 100 under pressure via a pump (not shown). The pump is preferably driven by an engine (not shown) or motor (not shown) and may be, for example, a gear pump, a vane pump, a gerotor pump, or any other positive displacement pump. The pressure control subsystem 102 may further include pressure regulator valves, solenoids, and other control devices used to regulate the pressure of the hydraulic control fluid 112 provided to the subsystems 104, 106, 108, and 110. The ratio control subsystem 104 is operable to control the position and clamping forces of a primary pulley 116A and a secondary pulley 116B. Translation of the pulleys 116A, 116B correlates to movement of a belt (not shown) or chain in the CVT which varies the output or gear ratio of the CVT. The TCC subsystem 106 controls the operation of a torque converter 118 and may include various control devices (not shown) such as a TCC regulator valve, a converter control valve, a TCC fault valve, and solenoids. The ESS subsystem 108 provides hydraulic control fluid 112 at pressure to the subsystems 104, 106, and 110 during an automatic engine stop/start event where the engine is automatically shut off during certain operating conditions. During this event, the engine driven pump is also shut off, thereby leading to a drop in pressure within the hydraulic control system 100. The ESS subsystem includes control devices, such as an electric powered auxiliary oil pump (not shown), and an energy storage device, such as an accumulator (not shown), that provides pressurized hydraulic control fluid 112 to the system 100 during the engine shutoff event. The ETRS subsystem 110 converts electronic input for a requested range selection (Park, Reverse, Neutral, Drive) from a user interface 120 (e.g. stick shift) or controller (e.g. a transmission control module or engine control module or powertrain control module or body control module) into hydraulic and mechanical commands. The mechanical commands include engaging and disengaging a park mechanism 122 and engaging or disengaging a forward clutch 124 and a Reverse clutch 126.

Figure 2:
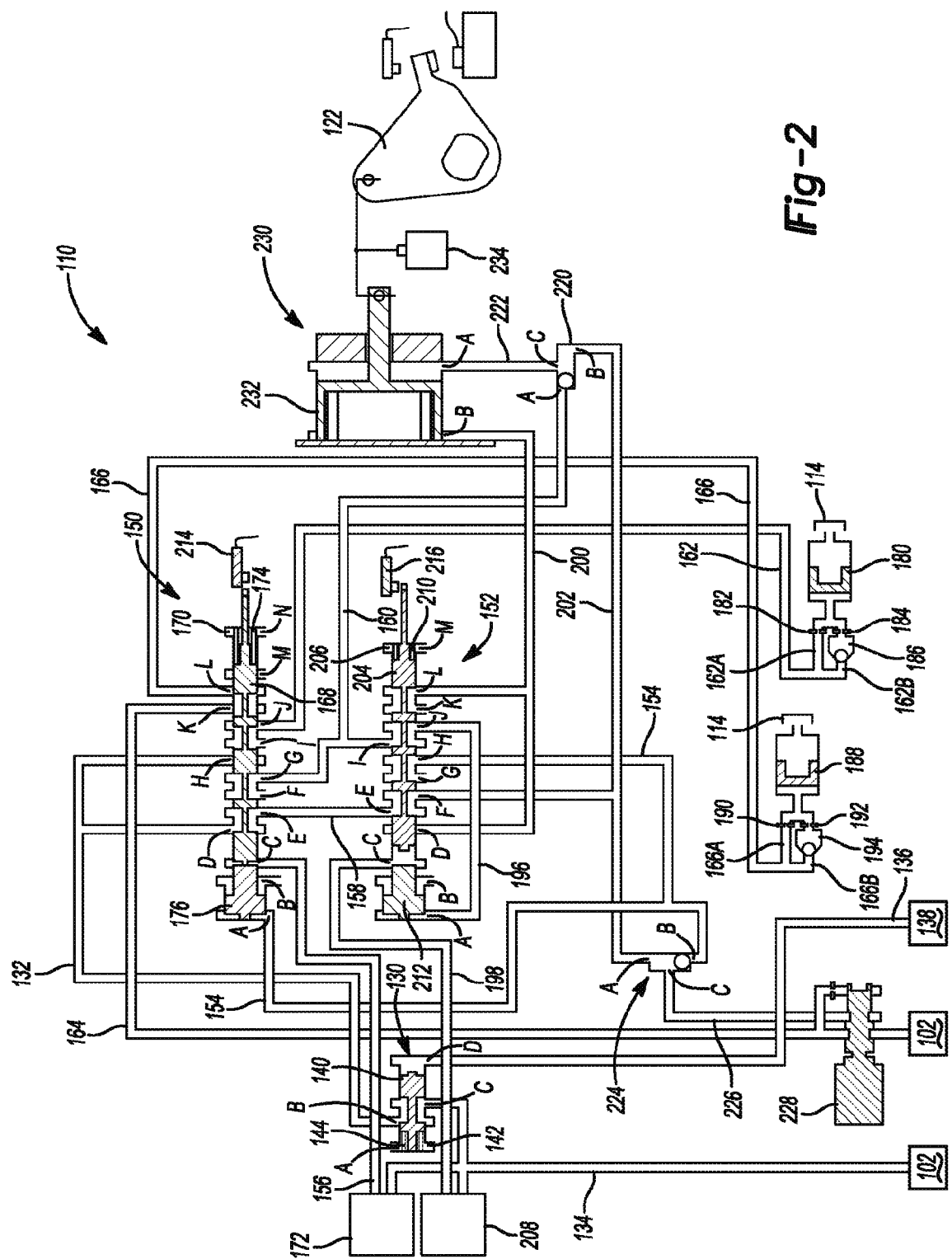
FIG. 2 is a diagram of a portion of a hydraulic control system according to the principles of the present invention.

Turning now to FIG. 2, the ETRS control subsystem 110 includes an enablement valve assembly 130. The enablement valve assembly includes fluid ports 130A-D. Fluid port 130A is an exhaust port that communicates with the sump 114 or an exhaust backfill circuit (not shown). Fluid port 130B communicates with a range feed line 132. Fluid port 130C communicates with a solenoid supply line 134. The solenoid supply line 134 is connected to the pressure regulator subsystem 102 and delivers pressurized hydraulic fluid 112 to port 130C. Fluid port 130D communicates with a signal line 136. The signal line 136 is connected to a control device, such as a solenoid 138. The enablement valve assembly 130 further includes a spool valve 140 is slidably disposed within a bore 142. When pressurized fluid is supplied through the signal line 136, fluid pressure acts upon the spool valve 140 through the fluid port 130D and moves the spool valve 140 against a spring 144 into a stroked or first position, by way of example. The spool valve 140 is actuated to a de-stroked position by the spring 144 when the pressure in the signal line 136 drops below a threshold. When the spool valve 140 is stroked into the first position, the fluid port 130C communicates with and provides pressurized hydraulic fluid to the fluid port 130B. When the spool valve 140 is in the de-stroked position, fluid port 130B is blocked preventing communication to fluid port 130C.

The ETRS subsystem 110 further includes first and second mode valve assemblies 150, 152 that communicate in series with one another and with the enablement valve assembly 130. The first mode valve 150 includes ports 150A-N, numbered consecutively from left to right in FIG. 2. Ports 150B, 150F, 150I, 150M, and 150N are exhaust ports that communicate with the sump 114 or an exhaust backfill circuit. Ports 130D and 130H communicate with and receive hydraulic fluid from the range feed line 132. Port 150A communicates with a signal line 154. Port 150C communicates with a signal line 156. Port 150E communicates with a valve feed line 158. Port 150G communicates with an Out-of-Park (OOP) valve feed line 160. Port 150J communicates with a Drive or Forward clutch feed line 162. Port 150K communicates with a multiplexed feed line 164. Port 150L communicates with a Reverse clutch feed line 166.

The first mode valve assembly 150 further includes a spool valve 168 slidably disposed within a bore 170. The spool valve 168 is controlled by a first mode valve control solenoid 172 via the signal line 156. The first mode valve control solenoid 172 toggles the spool 168 between a "first" or Drive state and a "second" or Reverse state. It should be appreciated that the oil acting on spool 168 can come from any available oil such as a clutch feed, TCC control oil or a pulley control oil. In the Drive state the spool 168 is moved to the right against the bias of a spring 174 and port 150D is closed, port 150E exhausts to port 150F, port 150H feeds port 150G, port 150K feeds port 150J, and port 150L exhausts to port 150M. Therefore, in the Drive state fluid flows form the range feed line 132 to the OOP valve feed line 160 and fluid flows from the multiplexed feed line 164 to the Drive feed line 162. When the first mode valve assembly 150 is in the Reverse state (shown in FIG. 2), port 150D feeds port 150E, port 150G exhausts to port 150F, port 150H is closed, port 150J exhausts to port 150I, and port 150K feeds port 150L. Therefore, in the Reverse state fluid flows from the range feed line 132 to the valve feed line 158 and fluid flows from the multiplexed feed line 164 to the Reverse clutch feed line 166.

The first mode valve assembly 150 may further include a latch spool valve 176 slidably disposed within the bore 170. The latch spool valve 176 is actuated against the valve spool 168 to move the valve spool 168 to the Drive position when pressurized hydraulic fluid is communicated from signal line 154 to port 150A to act on the latch spool valve 176. The latch spool valve 176 can keep the valve spool 168 in the Drive position even if solenoid 172 fails to provide signal fluid to the signal line 156.

The Drive feed line 162 includes two parallel branches 162A and 162B that feed a Drive clutch actuator 180. An orifice or flow restriction 182 is disposed within the first branch 162A. An orifice or flow restriction 184 is disposed downstream of a one-way ball check valve 186 in the second branch 162B. The Drive clutch actuator 180 is configured to engage (or alternatively disengage) the Drive clutch 124 upon receipt of pressurized hydraulic fluid from the Drive feed line 162.

The Reverse feed line 166 includes two parallel branches 166A and 166B that feed a Reverse clutch actuator 188. An orifice or flow restriction 190 is disposed within the first branch 166A. An orifice or flow restriction 192 is disposed downstream of a one-way ball check valve 194 in the second branch 166B. The Reverse clutch actuator 188 is configured to engage (or alternatively disengage) the Reverse clutch 126 upon receipt of pressurized hydraulic fluid from the Reverse feed line 166.

The second mode valve assembly 152 generally includes ports 152A-M. Ports 152B, 152G, 152K and 152M are exhaust ports that communicate with the sump 114 or an exhaust backfill circuit. Port 152A communicates with a feedback line 196 which is connected to port 152J. Port 152C communicates with a signal line 198. Port 152D communicates with a Park feed line 200 which is also connected to port 152L. Port 152E communicates with the valve feed line 158. Port 152F communicates with an Out-of-Park (OOP) valve feed line 202. Port 152H communicates with the signal line 154. Port 152I communicates with the OOP valve feed line 160. Port 152J communicates with the feedback line 196.

The second mode valve assembly 152 includes a spool valve 204 slidably disposed within a bore 206. The spool valve 204 is controlled by a second mode valve control solenoid 208 via the signal line 198. The second mode valve control solenoid 208 toggles the spool 204 between a "first" or Out-of-Park (OOP) state and a "second" or Park state. It should be appreciated the oil acting on spool 204 can come from any available oil such as a clutch feed, TCC control oil or a pulley control oil. In the OOP state the spool 204 is moved to the right against the bias of a spring 210. In the OOP state, port 152D is closed, port 152E feeds port 152F, port 152H exhausts to port 152G, port 152I communicates with port 152J, and port 152L exhausts to port 152K. Thus, in the OOP state, hydraulic fluid is supplied to the OOP valve feed line 202 by the valve feed line 158 (when the first mode valve assembly 150 is in the Reverse state). In the Park state, port 152E feeds port 152D, port 152F exhausts to port 152G, port 152I communicates with port 152H, port 152J communicates with port 152K, and port 152L is closed. Thus, in the Park state, the Park feed line 200 is supplied hydraulic fluid form the valve feed line 158 when the first mode valve assembly is in the Reverse state.

The second mode valve assembly 152 may further include a latch spool valve 212 slidably disposed within the bore 206. The latch spool valve 212 is actuated against the valve spool 204 to move the valve spool 204 to the OOP position when pressurized hydraulic fluid is communicated from the feedback line 196 to port 150A to act on the latch spool valve 212. The latch spool valve 212 can keep the valve spool 204 in the OOP position even if solenoid 208 fails to provide signal fluid to the signal line 198.

The first mode valve assembly 150 may include a position sensor 214 and the second mode valve assembly 152 may include a position sensor 216, by way of example. It should be appreciated that pairs of position sensors may be used on mode valve assemblies 150 and 152 or the positions sensors omitted without departing from the scope of the invention.

A check valve 220 is connected between the OOP valve feed line 160 and the OOP valve feed line 202. The check valve 220 includes three ports 220A-C. The check valve 220 closes off whichever of the ports 220A and 220B that is delivering the lower hydraulic pressure and provides communication between whichever of the ports 220A and 220B having or delivering the higher hydraulic pressure and the outlet port 220C. Port 220A is connected to the OOP valve feed line 160. Port 220B is connected to the OOP valve feed line 202. Port or outlet 220C is connected to an out-of-Park (OOP) feed line 222.

A check valve 224 is connected between the OOP valve feed line 202 and the signal line 154. The check valve 224 includes three ports 224A-C. The check valve 224 closes off whichever of the ports 224A and 224B that is delivering the lower hydraulic pressure and provides communication between whichever of the ports 224A and 224B having or delivering the higher hydraulic pressure and the outlet port 224C. Port 224A is connected to OOP valve feed line 202. Port 224B is connected to the signal line 154. Port or outlet 224C is connected to a solenoid feed line 226.

The solenoid feed line 226 is connected to and feeds a Drive/Reverse solenoid valve assembly 228. The Drive/Reverse solenoid is provided hydraulic fluid by the pressure regulator subsystem 102 and by the solenoid feed line 226. The Drive/Reverse solenoid is preferably normally high or open and selectively communicates hydraulic fluid to the multiplexed feed line 164 in order to selectively engage the Drive and Reverse clutches 124, 126.

The Park feed line 200 and the OOP feed line 222 each communicate with a Park servo 230. The Park servo 230 includes ports 230A and 230B each located on either side of a piston 232. The piston 232 is mechanically coupled to the park mechanism 122. Port 230A communicates with the OOP feed line 222 and port 230B communicates with the Park feed line 200. The piston 232 is moved by hydraulic fluid supplied by one of the fluid lines 222, 200 acting on either side of the piston 232. Movement of the piston 232 mechanically disengages or engages the Park mechanism 122.

The Park mechanism 122 is connected with a Park Inhibit Solenoid Assembly (PISA) 234. The PISA 234 is actuatable to mechanically prevent the Park mechanism 122 from engaging during an engine stop-start event (i.e. when the vehicle is intended to be mobile during an automatic engine stop).

Figure 3:
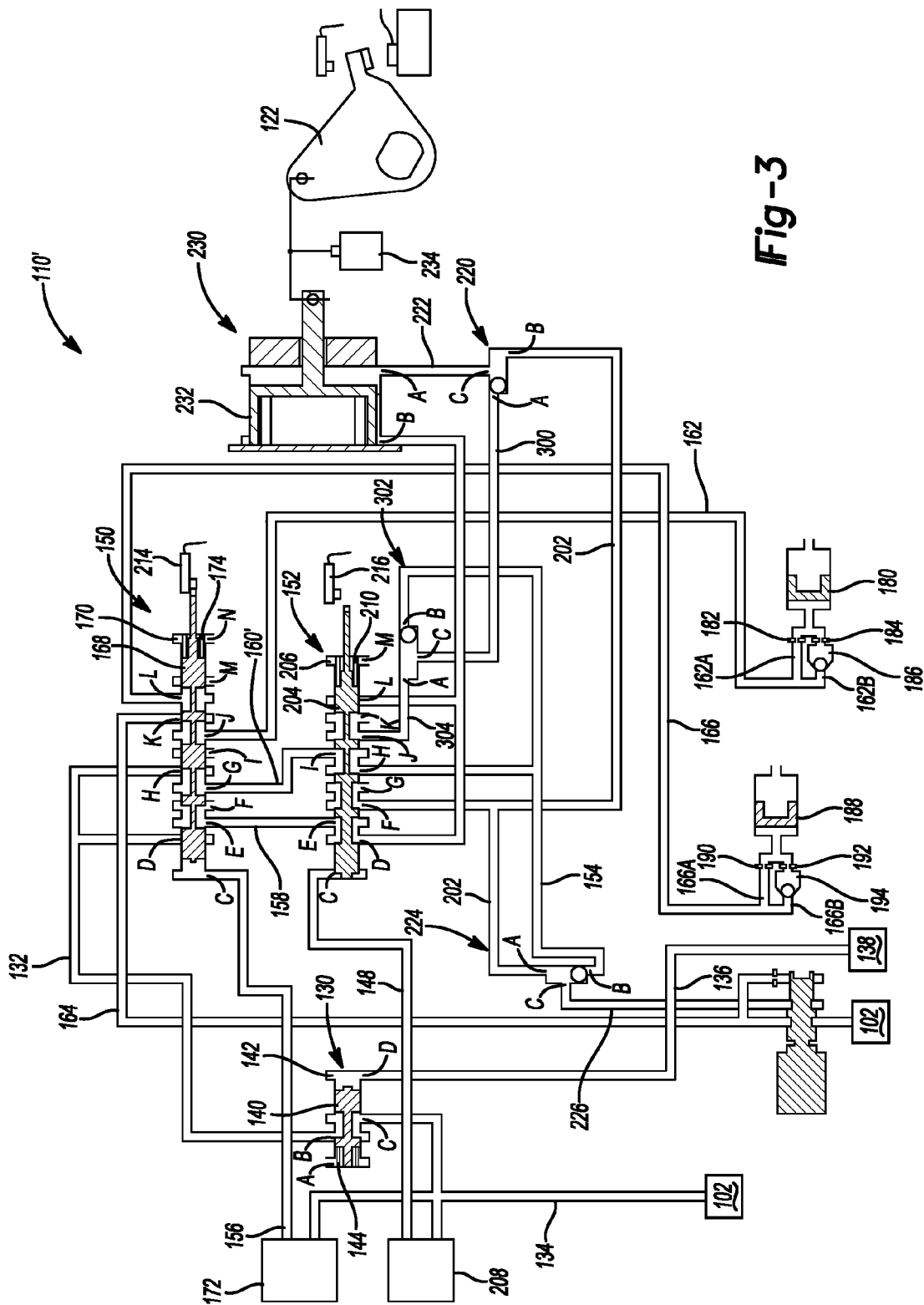
FIG. 3 is a diagram of a portion of an alternate embodiment of the hydraulic control system according to the principles of the present invention.

Turning to FIG. 3, an alternate embodiment of an ETRS subsystem is generally indicated by reference number 110'. The ETRS subsystem 110' shares common components with the ETRS subsystem 110 shown in FIG. 1 and therefore like components have been indicated by like reference numbers. However, in the ETRS subsystem 110', the latch spool valves 176 and 212 have been removed, and consequently ports 150A, 150B and ports 152A, 152B. Moreover, the OOP valve feed line 160 has been replaced with a mode valve feed line 160' that does not communicate with the check valve 220. Instead, the port 220A of check valve 220 communicates with an intermediate line 300. In addition, the ETRS subsystem 110' includes a third check valve 302.

The check valve 302 is connected to the port 152J by a feed line 304. The check valve 302 includes three ports 302A-C. The check valve 302 closes off whichever of the ports 302A and 302B that is delivering the lower hydraulic pressure and provides communication between whichever of the ports 302A and 302B having or delivering the higher hydraulic pressure and the outlet port 302C. Port 302A is connected to feed line 304. Port 302B is connected to the signal line 154. Outlet port 302C is connected to the intermediate line 300.

It should be appreciated that other orifice and check ball arrangements can be used without departing from the scope of present invention, including a single orifice for fill and exhaust, or filling through a single orifice and exhausting through two orifices. Likewise while individual fluid lines have been described, it should be appreciated that fluid lines, flow paths, passageways, etc., may contain other shapes, sizes, cross-sections, and have additional or fewer branches without departing from the scope of the present invention. Describing a first component of the hydraulic control system as "downstream" of a second component means the first component predominantly receives hydraulic fluid from the second component. Likewise, describing a first component of the hydraulic control system as "upstream" of a second component means the first component predominantly provides hydraulic fluid to the second component.

The description of the invention is merely exemplary in nature and variations that do not depart from the general essence of the invention are intended to be within the scope of the invention. Such variations are not to be regarded as a departure from the spirit and scope of the invention.

The following is claimed:

1. A hydraulic control system for a continuously variable transmission having a drive clutch, a reverse clutch, and a park mechanism, the hydraulic control system comprising:
   a source of pressurized hydraulic fluid;
   a first mode valve assembly in fluid communication downstream of the source of pressurized hydraulic fluid;
   a drive clutch actuator connected to the drive clutch and in fluid communication downstream of the first mode valve assembly;
   a reverse clutch actuator connected to the reverse clutch and in fluid communication downstream of the first mode valve assembly;
   a second mode valve assembly in fluid communication directly downstream of the first mode valve assembly; and
   a park servo connected to the park mechanism and in selective fluid communication downstream of the first mode valve assembly and the second mode valve assembly.

2. The hydraulic control system of claim 1 wherein the first mode valve assembly includes a first mode valve moveable between a drive position and a reverse position, wherein the first mode valve allows fluid communication from the source to the drive clutch actuator when in the drive position and allows fluid communication from the source to the reverse clutch actuator when in the reverse position.

3. The hydraulic control system of claim 2 wherein the second mode valve assembly includes a second mode valve moveable between an out-of-park position and a park position, wherein the second mode valve allows fluid communication to an out-of-park side of the park servo when in the out-of-park position and prohibits fluid communication to the out-of-park side of the park servo when in the park position.

4. The hydraulic control system of claim 3 further comprising a first solenoid in fluid communication with the first mode valve, wherein the first solenoid selectively moves the first mode valve to the drive position.

5. The hydraulic control system of claim 4 further comprising a second solenoid in fluid communication with the second mode valve, wherein the second solenoid moves the second mode valve to the out-of-park position.

6. The hydraulic control system of claim 5 further comprising an enablement valve assembly in fluid communication downstream of the source of pressurized hydraulic fluid and in fluid communication directly upstream of the first mode valve assembly.

7. The hydraulic control system of claim 1 further comprising a first valve position sensor configured to sense the position of the first mode valve and a second valve position sensor configured to sense the position of the second mode valve.

8. The hydraulic control system of claim 1 further comprising a drive/reverse solenoid in fluid communication downstream of the second mode valve assembly and in fluid communication directly upstream of the first mode valve assembly.

9. The hydraulic control system of claim 8 further comprising a first three-way ball check valve in fluid communication directly downstream of the second mode valve assembly and in fluid communication directly upstream of the drive/reverse solenoid.

10. The hydraulic control system of claim 9 further comprising a second three-way ball check valve in fluid communication directly downstream of the first and the second mode valve assembly and in fluid communication directly upstream of an out-of-park side of the park servo.

11. A hydraulic control system for a continuously variable transmission having a drive clutch, a reverse clutch, and a park mechanism, the hydraulic control system comprising:
   a source of pressurized hydraulic fluid;
   a first mode valve assembly having a first inlet port in fluid communication with the source of pressurized hydraulic fluid and selectively communicable with a first outlet port, a second inlet port in fluid communication with the source of pressurized hydraulic fluid and selectively communicable with a second outlet port, a drive/reverse inlet port selectively communicable with a reverse outlet port and a drive outlet port, and a first mode valve moveable between a drive position and a reverse position;
   a drive clutch actuator connected to the drive clutch and in fluid communication with the drive outlet port of the first mode valve assembly;
   a reverse clutch actuator connected to the reverse clutch and in fluid communication with the reverse outlet port of the first mode valve assembly;
   a second mode valve assembly having a first inlet port in fluid communication directly with the first outlet port of the first mode valve assembly and selectively communicable with a park outlet port and an out-of-park outlet port, a second inlet port in fluid communication directly with the second outlet port of the first mode valve assembly and selectively communicable with a first outlet port, and a second mode valve moveable between a park position and an out-of-park position; and a park servo connected to the park mechanism and having a park side and an out-of-park side, wherein the park side is in fluid communication with the park outlet port of the second mode valve assembly and the out-of-park side is in selective fluid communication with the out-of-park outlet port of the second mode valve assembly and with the second outlet of the first mode valve assembly.

12. The hydraulic control system of claim 11 wherein when the first mode valve is in the drive position the second inlet port communicates with the second outlet port and the drive/reverse inlet port communicates with the drive outlet port, and when the first mode valve is in the reverse position the first inlet port communicates with the first outlet port and the drive/reverse inlet port communicates with the reverse outlet port.

13. The hydraulic control system of claim 12 wherein when the second mode valve is in the out-of-park position the first inlet port communicates with the out-of-park outlet port and when the second mode valve is in the park position the first inlet port communicates with the park outlet port and the second inlet port communicates with the first outlet port.

14. The hydraulic control system of claim 11 further comprising a first solenoid in selective fluid communication with the first mode valve, wherein the first solenoid selectively moves the first mode valve to the drive position.

15. The hydraulic control system of claim 14 further comprising a second solenoid in selective fluid communication with the second mode valve, wherein the second solenoid moves the second mode valve to the out-of-park position.

16. The hydraulic control system of claim 11 further comprising an enablement valve assembly disposed between the fluid communication between the source of pressurized hydraulic fluid and the first and second inlet ports of the first mode valve assembly, wherein the enablement valve assembly is configured to selectively allow fluid communication between the source of pressurized hydraulic fluid and the first and second inlet ports of the first mode valve assembly.

17. The hydraulic control system of claim 11 further comprising a first valve position sensor configured to sense the position of the first mode valve and a second valve position sensor configured to sense the position of the second mode valve.

18. The hydraulic control system of claim 11 further comprising a drive/reverse solenoid in fluid communication downstream of the second mode valve assembly and in fluid communication with the drive/reverse inlet port of the first mode valve assembly.

19. The hydraulic control system of claim 18 further comprising a first three-way ball check valve having a first inlet and a second inlet selectively communicable with an outlet, wherein the first inlet is in fluid communication with the out-of-park outlet port of the second mode valve assembly, the second inlet is in fluid communication with the first outlet of the second mode valve assembly, and the outlet is in fluid communication with the drive/reverse solenoid.

20. The hydraulic control system of claim 19 further comprising a second three-way ball check valve having a first inlet and a second inlet in selective fluid communication with an outlet, wherein the first inlet is in fluid communication with the second outlet port of the first mode valve assembly, the second inlet is in fluid communication with the out-of-park outlet port of the second mode valve assembly, and the outlet is in fluid communication with the out-of-park side of the park servo.

* * * * *